United States Patent [19]
Beigel

[11] Patent Number: 5,559,507
[45] Date of Patent: *Sep. 24, 1996

[54] SIGNAL TRANSMISSION AND TAG READING CIRCUIT FOR AN INDUCTIVE READER

[75] Inventor: Michael L. Beigel, Corona, Calif.

[73] Assignee: Avid Marketing, Inc., Norco, Calif.

[ * ] Notice: The term of this patent shall not extend beyond the expiration date of Pat. No. 5,266,926.

[21] Appl. No.: 150,175

[22] PCT Filed: May 28, 1992

[86] PCT No.: PCT/US92/04608

§ 371 Date: Nov. 30, 1993

§ 102(e) Date: Nov. 30, 1993

[87] PCT Pub. No.: WO92/22045

PCT Pub. Date: Dec. 10, 1992

Related U.S. Application Data

[63] Continuation of Ser. No. 708,028, May 31, 1991, Pat. No. 5,266,926.

[51] Int. Cl.$^6$ .......................... G06K 19/077; G01S 13/75
[52] U.S. Cl. ..................................... 340/825.54; 340/572
[58] Field of Search ............................. 340/825.54, 572, 340/505, 870.35; 455/41; 342/30, 44, 51

[56] References Cited

U.S. PATENT DOCUMENTS

| | | | |
|---|---|---|---|
| 3,022,492 | 2/1962 | Kleist et al. | 340/825.54 |
| 3,299,424 | 1/1967 | Vinding | 340/870.31 |
| 3,406,391 | 10/1968 | Le Von, Jr. | 342/44 |
| 3,427,614 | 2/1969 | Vinding | 342/50 |
| 3,541,995 | 11/1970 | Fathauer | 340/825.54 |
| 3,557,758 | 1/1971 | Lack | 340/825.54 |
| 3,588,671 | 6/1971 | Deboo | 363/127 |
| 3,689,885 | 9/1972 | Kaplan et al. | 342/42 |
| 3,691,549 | 9/1972 | Wilson | 340/527 |
| 3,752,960 | 8/1973 | Walton | 340/825.54 |
| 3,816,709 | 6/1974 | Walton | 340/825.34 |
| 3,859,624 | 1/1975 | Kriofsky et al. | 340/505 |
| 3,898,619 | 8/1975 | Carsten et al. | 340/572 |
| 3,944,928 | 3/1976 | Augenblick et al. | 340/572 |
| 3,964,024 | 6/1976 | Hutton et al. | 340/825.34 |
| 4,040,053 | 8/1977 | Olsson | 342/42 |
| 4,129,855 | 12/1978 | Rodrian | 340/825.34 |
| 4,196,418 | 4/1980 | Kip et al. | 340/825.54 |
| 4,209,783 | 6/1980 | Ohyama et al. | 340/825 |
| 4,242,663 | 12/1980 | Slobodin et al. | 235/380 |
| 4,247,758 | 1/1981 | Rodrian | 377/6 |
| 4,333,072 | 6/1982 | Beigel | 340/825.54 |
| 4,364,043 | 12/1982 | Cole et al. | 340/825.54 |
| 4,388,524 | 6/1983 | Walton | 235/380 |
| 4,510,495 | 4/1985 | Sigrimis et al. | 340/825.54 |
| 4,517,563 | 5/1985 | Diamant | 340/825.54 |
| 4,561,443 | 12/1985 | Hogrefe et al. | 607/31 |

(List continued on next page.)

FOREIGN PATENT DOCUMENTS

WO85/03831  8/1985  WIPO .............................. H04Q 9/00

*Primary Examiner*—Alyssa H. Bowler
*Assistant Examiner*—Mark H. Rinehart
*Attorney, Agent, or Firm*—Graham & James LLP

[57] ABSTRACT

A field coil signal transmission and tag reading circuit is disclosed for use in an inductive tag reader system. The circuit is coupled to an oscillator which provides a drive signal to a differential driver. The driver transforms the clock signal into first and second complementary drive signals. The drive signals are coupled to a field coil through a plurality of capacitors for inductively producing an output power signal. The capacitors are differentially coupled to the coil, so that each input of the coil is coupled to one of the clock signals through a separate capacitor. A bridge rectifier is coupled to the field coil opposite the capacitors for producing an output comprising a direct current element and an alternating current element superimposed on the DC element. A resistance-capacitance (R-C) filter, coupled to the bridge rectifier, provides a filtered rectifier output signal. The output signal can be decoded downstream of the R-C filter using several different decoding schemes known in the art.

16 Claims, 7 Drawing Sheets

U.S. PATENT DOCUMENTS

| | | | |
|---|---|---|---|
| 4,571,589 | 2/1986 | Slocum et al. | 340/870.32 |
| 4,602,253 | 7/1986 | Kreft | 340/825.69 |
| 4,625,730 | 12/1986 | Fountain et al. | 607/4 |
| 4,656,463 | 4/1987 | Anders et al. | 340/572 |
| 4,691,202 | 9/1987 | Denne et al. | 340/825.54 |
| 4,724,427 | 2/1988 | Carroll | 340/825.54 |
| 4,730,188 | 3/1988 | Milheiser | 340/825 |
| 4,752,776 | 6/1988 | Katzenstein | 340/825.54 |
| 4,787,384 | 11/1988 | Campbell et al. | 606/117 |
| 4,857,893 | 8/1989 | Carroll | 340/572 |
| 4,864,633 | 9/1989 | Chatelot | 455/41 |
| 4,899,157 | 2/1990 | Sanford et al. | 342/40 |
| 5,008,661 | 4/1991 | Raj | 340/825.54 |
| 5,012,236 | 4/1991 | Troyk et al. | 340/825.54 |
| 5,025,550 | 6/1991 | Zirbes et al. | 29/605 |
| 5,041,826 | 8/1991 | Milheiser | 340/825.54 |
| 5,050,292 | 9/1991 | Zirbes et al. | 29/605 |
| 5,084,699 | 1/1992 | DeMichele | 340/825.54 |
| 5,095,309 | 3/1992 | Troyk | 340/825.54 |
| 5,103,222 | 4/1992 | Esch et al. | 340/825.54 |
| 5,166,676 | 11/1992 | Milheiser | 340/825.54 |
| 5,193,539 | 3/1993 | Schulman et al. | 607/61 |
| 5,193,540 | 3/1993 | Schulman et al. | 607/61 |
| 5,211,129 | 5/1993 | Taylor et al. | 119/215 |
| 5,214,409 | 5/1993 | Beigel | 340/825.54 |
| 5,235,326 | 8/1993 | Beigel et al. | 340/825.54 |
| 5,257,011 | 10/1993 | Beigel | 340/825.54 |
| 5,266,926 | 11/1993 | Beigel | 340/572 |

SIGNAL TRANSMISSION AND TAG READING CIRCUIT FOR AN INDUCTIVE READER

This application is a continuation of U.S. Pat. No. 5,266,926, application Ser. No. 07/708,028, filed May 31, 1991.

FIELD OF THE INVENTION

The present invention relates generally to electronic inductive identification systems. The invention specifically relates to a rectified balanced resonant signal transmission and tag power consumption measurement circuit coupled to a field generation coil which permits measuring field power consumption of a passive tag circuit, in inductively coupled identification systems.

BACKGROUND OF THE INVENTION

Identification of free-roaming animals and movable objects is desirable to scientists, ranchers, and persons providing inventory control. The challenge is to provide a convenient means for attaching identification information to a movable object or animal. One simple method is to attach a visible tag to the object or animal with identification data written thereon. However, such tags are easily altered or destroyed, enabling an interloper to claim title to the tagged property.

Therefore, others have developed several ways to conceal tags, implant tags in animals, and provide encoded tag information which is machine-readable but unintelligible to the naked eye. For example, a label can be provided with a bar code, and a bar code reader can be used to read identifying information from the label. Unfortunately, bar code systems can store only a small amount of information, and the bar code can be altered or destroyed. Also, the bar code must be clearly visible for proper reading.

One way to avoid the problem of visibility is to use a sealed tag with identifying information electronically stored in a memory means such as an integrated circuit memory. With such a device, one must provide a means for reading the memory means, since the memory means is concealed from view. Radio transmission could be considered, but its bandwidth is very limited, reducing the speed of transmission and data-carrying capacity; suitable equipment would also require compliance with numerous federal broadcasting regulations. Miniaturization of radio transmitters for implantation in a living animal is also impractical.

Therefore, inductive closed-coupled identification systems have been developed, having a sealed tag and a reader using electromagnetic energy transmitted to the tag. Such inductive systems can include a passive implanted tag with a memory means coupled to an inductive coil which serves as an antenna and facilitates an inductive power supply. A separate tag reader which can include a battery power supply has a field coil for transmitting a high-power electromagnetic field to the tag. The field is received by the tag and converted through induction to a direct current power supply signal to run the tag circuitry. The tag can then retransmit identification data to the reader by reading the tag memory means, and the reader can display the data. These systems permit powering a passive identification tag transponder by an electromagnetically coupled energizer reader, and the transmission of an ID signal through a single coil in the tag. This type of system is disclosed in U.S. Pat. No. 4,703,756, which discloses a battery powered implant which transmits a signal to an external receiver, and also in U.S. Pat. No. 3,689,885 (Kaplan et al.) and 3,869,624 (Kriofsky et al.). A similar approach is disclosed in U.S. Pat. No. 3,706,094 (Cole et al.) which describes an identification tag with a substrate of piezo-electric material with coded information stored therein. Energy transmitted by a reader to the tag is converted into acoustic energy, modulated, reconverted to electromagnetic energy, and retransmitted to the reader.

Unfortunately, all the systems of these prior art devices require means in the tag for retransmitting data. This approach requires use of two transmission-reception channels as well as transmission and reception circuitry in both the reader and the tag. Since it is desirable to miniaturize the tag, especially when the tag must be implanted in an animal, it is desirable to eliminate as many parts in the tag as possible. Conventional systems are also susceptible to interception of signals by undesired observers or listeners, and by interference signals in the environment.

Figure 1A:
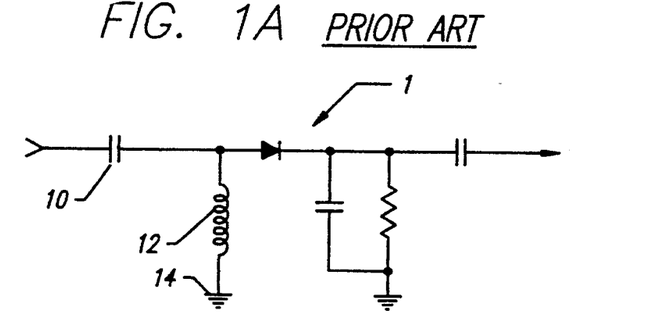
FIG. 1A is a schematic diagram of a prior art field coil circuit.

In a prior art reader a single-ended circuit is used such as that shown in FIG. 1A. A single capacitor 10 is employed in series with a single-ended driver coil 12 which together provide a resonant circuit. This type of system is also disclosed in U.S. Pat. No. 4,730,188 (Milheiser), which shows an interrogator coil 14 in FIG. 1 with one side coupled to ground and a signal detection system coupled to the other side at point TSI-7. However, such single-sided systems are highly susceptible to electromagnetic interference because of the ground coupling.

To address these and other drawbacks, a reader and tag system is known which reads tag data by providing a variable loading means in the tag, as disclosed in U.S. Pat. Nos. 4,517,563 and 4,333,072. To decode the data, the reader measures power output and loading by the tag. The modulated power signal is decoded to separate a data element for later digital interpretation. This permits detecting the tag ID signal through a coil in the tag reader by sequentially varying the reader power consumption of the tag in accordance with a pre-determined code number. Signals other than fixed ID numbers may also be transmitted. However, the '072 patent discloses a field coil circuit which does not efficiently generate output power and which has relatively low ripple characteristics. Thus, common mode rejection is average, making the circuit susceptible to electromagnetic interference (EMI).

Providing a rectifier in a tag for conventional power supply voltage rectification is known, as disclosed in U.S. Pat. No. 4,196,418 (Kip et al.) and 4,724,427 (Carroll). Carroll discloses use of a rectifier in a tag of an inductively coupled transponder system; the rectifier provides tag power rectification and provides balanced modulation of the tag ID code into the tag coil. This circuit mixes the modulation signal into the power field of the energizing device rather than causing a variable loading of the tag, and thus operates similar to the active transponder type of tag systems. U.S. Pat. Nos. 3,440,663 and 3,299,424 (Vending) each disclose in FIG. 1 a diode 26 which series as a signal detector. However, the diode simply provides a voltage drop to enable load detection rather than acting as a rectifier. Thus, the Vinding circuits do not provide an increase in ripple frequency.

Therefore, users of inductively coupled identification systems desire to have an efficient high-power reader system which increases the practical distance by which the reader and tag can be operationally separated by radiating maximum output power at the resonant frequency, and which is maximally sensitive to changes in power consumption by the tag at the frequency of information transmission. Moreover, users desire a system which is more immune to EMI, and which extends battery life by consuming less input power. It is also desirable to have a transmission and power consumption measurement circuit in a reader which is inexpensive, and forms improved signals with greater power and ripple.

SUMMARY OF THE INVENTION

Accordingly, the present invention provides a rectified balanced resonant signal transmission and tag power consumption measurement circuit coupled to a field generation coil which permits measuring field power consumption of a passive tag circuit, in inductively coupled identification systems. The circuit is coupled to an oscillator in the reader which provides a pulse train or driver signal to a differential driver. The driver converts the driver signal into first and second complementary drive signals. The drive signals are coupled to a field coil through a plurality of capacitors for inductively producing an output power signal. The capacitors are differentially coupled to the coil, so that each of two inputs of the coil is coupled to one of the drive signals through a separate capacitor. A bridge rectifier is coupled to the coil opposite the capacitors for producing an output voltage comprising a direct current (DC) voltage element and an alternating current (AC) voltage element superimposed on the DC voltage element. A resistance-capacitance (R-C) filter, coupled to the bridge rectifier, provides a filtered rectifier output signal.

The output signal can be decoded downstream of the R-C filter using several different decoding schemes known in the art. For example, a plurality of frequency filters can be coupled to the R-C filter for removing the DC voltage element from the output voltage, and a comparator or FSK decoder can be coupled to the frequency filters for converting the AC voltage element to a signal representative of power consumption.

DETAILED DESCRIPTION OF THE PREFERRED EMBODIMENTS

In the following description, specific technical terms are used for the sake of clarity. However, the invention is not limited to the specific terms selected. Rather, the invention includes all technical equivalents functioning in substantially the same way to achieve substantially the same result.

The present invention is a signal transmission and tag power consumption measurement circuit for an inductive reader in an inductively coupled identification system. In operation, the reader radiates a sinusoidal waveform electromagnetic field into space at a specific frequency designated F(t). An identification (ID) tag with an antenna resonant at F(t) detects energy from the radiated field and inductively converts the field to an adequate internally generated supply voltage and current for an electronic circuit in the tag. The tag circuit has a power supply, a variable loading element, a clocking and sequencing section, and a programmable memory. The power supply converts AC energy at the resonant frequency into a DC supply voltage to power the electronic circuits in the tag reliably over as wide a range of input energy values as possible.

The clocking section is driven by a signal derived from the electromagnetic field at its frequency of transmission. The sequencing section is therefore driven at a sub-multiple of the reader frequency, and is synchronous with the reader frequency. The data signal from the memory controls the loading element to provide a greater or lesser power consumption of the entire tag circuitry congruent with the synchronous data output of the memory. Sensing circuitry in the reader monitors variations in the energy emitted by the reader drive coil. The variations are decoded into a digital signal congruent to the synchronous data signal generated by the sequencing of the memory in the tag unit. Decoding and display circuitry and/or software are provided to translate the digital signal into usable data according to a predetermined format for information retrieval or transmission purposes.

The reader can be powered by a conventional regulated direct current (DC) power supply preferably using batteries as an input current source or an external D.C. supply. As is known in the art, the power supply can be formed around an integrated circuit voltage regulator such as a device of type LM2931 made by Motorola Semiconductors, P.O. Box 20912, Phoenix, Ariz.

Figure 2:
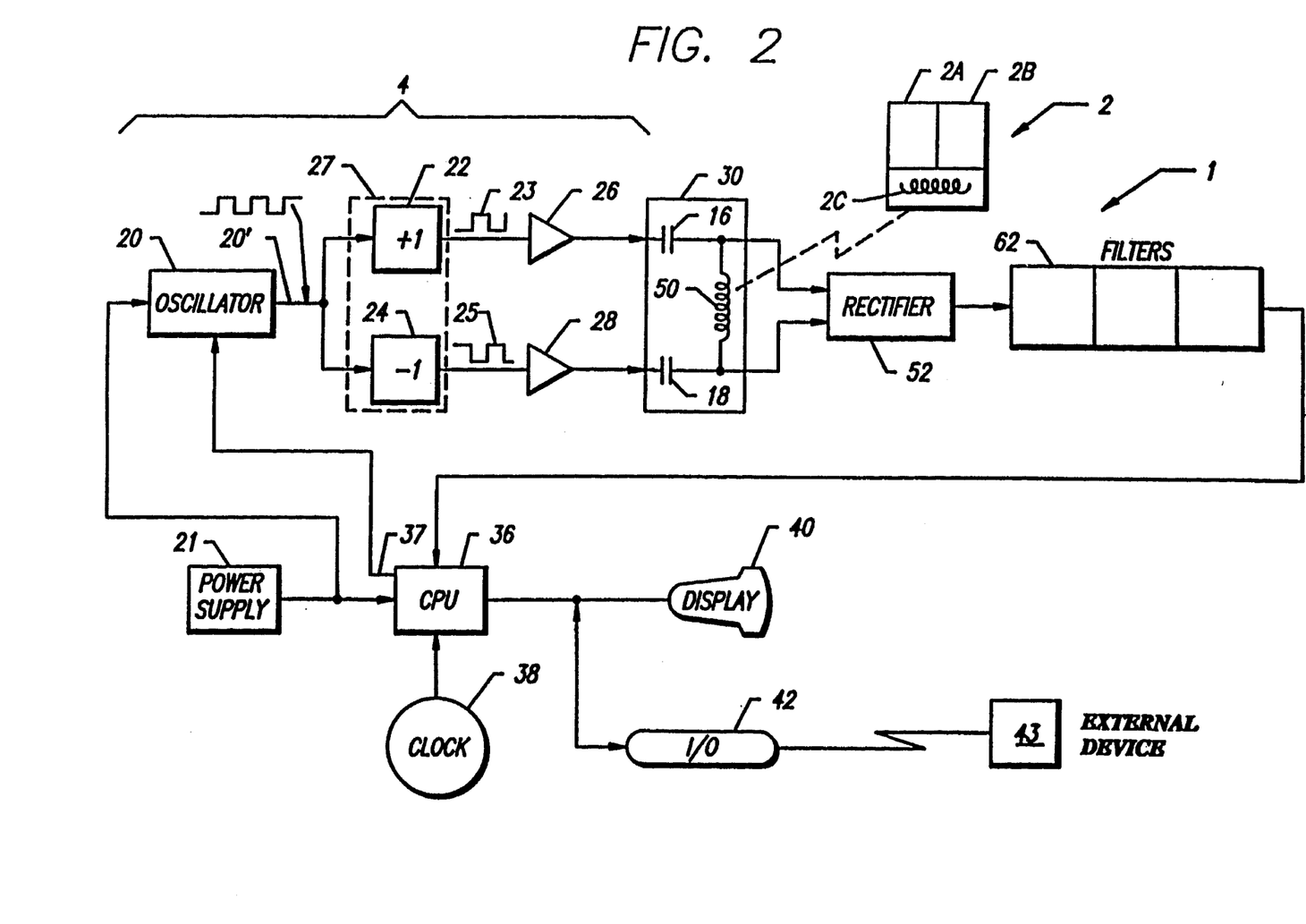
FIG. 2 is a block diagram of a second embodiment of a circuit of the invention.

FIG. 2 provides a block diagram of a system including a reader 1 and a tag 2 and embodies the present invention. The reader 1 includes a balanced resonant coil detection circuit (coil circuit) 30. Preferably the coil circuit 30 is coupled to a balanced differential coil driver circuit 4. The driver circuit includes an oscillator 20 producing regular reoccurring pulses in a single drive signal on an oscillator output line 20' at the transmission frequency F(t). The drive signal may be a sine wave, triangle wave, square wave, or other waveform with a pulse time or period corresponding to the desired transmission frequency. Preferably a low-impedance driver is used. A differential signal driver means 27, including signal drivers 22, 24 is provided in which the positive driver 22 produces the F(t) waveform at 0 degrees and the negative driver 24 produces the same signal inverted or shifted 180 degrees. Thus the driver means 27 transforms the clock signal into two, first and second complementary pulse trains or drive signals 23, 25.

The drive signals are coupled to a field coil or coil means 50. As shown in more detail in FIG. 1B, to enable differential sensing of variations of voltage (or current) in the coil 50, dual differentially coupled capacitors 16, 18 are provided, one between each end of the coil 50 and one of the amplifiers 26, 28. The capacitors are differentially coupled to the field coil means 50, so that each input of the coil is coupled to one of the clock drive 23, 25 through a separate capacitor. As is known in the art, the resonance of the system can be determined by the field coil inductance and the capacitance of both capacitors 16, 18. Preferably the capacitors are equal in value, thereby providing a differential signal with high common-mode rejection, providing superior isolation of the field coil from EMI. In contrast, the prior art circuit of FIG. 1A lacks coupling capacitors, causing the circuit of FIG. 1A to lack common-mode rejection, therefore being susceptible to EMI.

To enable calibration and tuning the device to a particular field coil frequency, it is desirable to provide a variable capacitor in place of each capacitor 16, 18. One method is to provide a variable trimmer capacitor 19' in parallel with a main capacitor 19, as shown in FIG. 1C. However, variable capacitors rated for the high voltage developed across the coil are relatively expensive. A precision-rated high-voltage (e.g. 650 V.D.C.) fixed-value capacitor can be used. Unfortunately, typical commercially available mica capacitors rarely provide exactly the rated capacitance; usually actual capacitance varies from the stated rating by several percent. Therefore, calibration of the capacitors is required. For example, four fixed-value mica capacitors 40a–40d can be provided for each coil side, coupled to jumper terminals J1 to J3, in the arrangement shown in FIG. 1D.

The oscillator section of one side of the circuit is coupled to point 42, and one side of the coil is coupled to point 44. Capacitor 40a is hard-wired into the circuit to provide a base capacitance value, but jumpers J1 to J3 permit selective connection and inclusion of capacitors 40b, 40c, and 40d. A calibration fixture can be used to measure the total capacitance of four or fewer of the four capacitors, and when the proper value is determined one or more of jumpers J1 to J3 can be soldered. The desired capacitor value is selected by shorting one or more of the jumper terminals. This enables customizing the circuit to suit the needs of a particular user.

Preferably the coil 50 comprises a single coil wound around an oval plastic core approximately 4⅝ inches long and 3¾ inches wide. The coil can be wound with, preferably, 90 to 100 of 28-gauge wire, yielding a coil with approximate inductance of 2.3 mH and approximate impedance of 7.6 ohms. In the disclosed circuit such a coil has produced a maximum effective reading distance of about 3⅝/16 inches.

The tag 2 of FIG. 2 can include a receiving coil 2C for inducing a tag power supply voltage from the signal generated by field coil 50. The tag can also include a memory 2A and other circuitry 2B for variably loading the tag as data is output from the memory. The tag 2 can have the structure of the tag disclosed in U.S. Pat. No. 4,333,072 (Beigel).

Figure 5A:
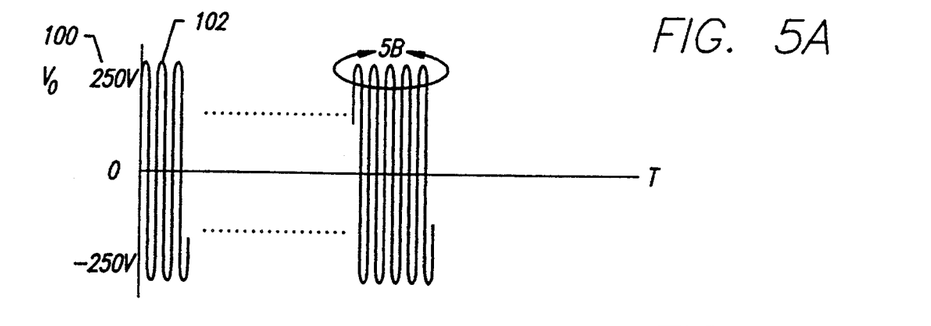
FIGS. 5A to 5E are plots of waveforms generated by the invention.

Measuring the signal produced across the coil when the circuit is in operation as a result of the changing power consumption of the tag yields a waveform such as 102 shown in FIG. 5A. The waveform 102 generally comprises a sine wave at frequency F(t) (equal to the oscillator frequency) with an amplitude of about 500 volts peak-to-peak, centered at 0 volts so that maximum center to positive voltage 100 is 250 v.

Figure 5B:
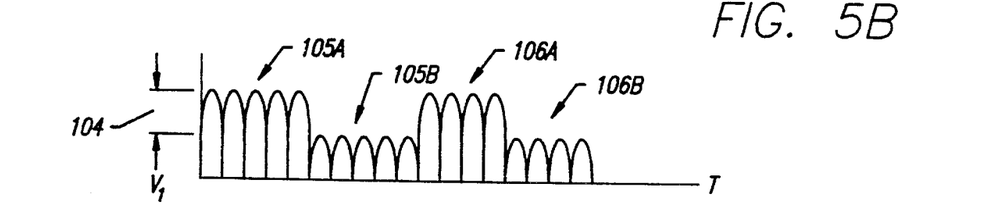

FIG. 5B provides an enlarged view of the edge of waveform 102 revealing that the FIG. 5A waveform is comprised of a series of waveform segments 105A, 105B, 106A, 106B. The exact shape of these segments can vary depending on the circuitry and communication protocol of the tag used in the system. One alternative is to use a frequency shift keyed (FSK) system resulting in the waveform of FIG. 5B. In this waveform, segments 105A and 106A have equal amplitude, as do segments 105B and 106B. However, the amplitude of segments 105A, 106A is greater than segments 105B, 106B by a voltage factor 104 of about 0.01 volts.

In one possible system using frequency shift keying (FSK), segments 105A, 105B each include five pulses or last for five clock cycles. Segments 106A, 106B each include four pulses or four clock cycles. Two segments correspond to one digital bit of information. As is known in the art, and as disclosed in U.S. Pat. No. 4,730,188 (Milheiser) especially FIG. 6 thereof, this difference in cycle count enables an FSK decoder to decode the different segment types and for a digital signal.

Figure 5C:
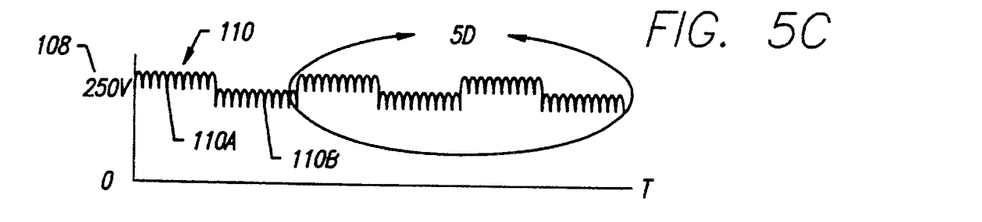

To extract the signal produced by the change in power consumption of the tag, the change in voltage across the coil (the change in amplitude of the segments) must be monitored. To do this, a bridge rectifier or rectifier means 52 is coupled across the ends of the driver coil 50 opposite the capacitors 16, 18 for producing an output voltage comprising a direct current (DC) voltage element and an alternating current (AC) voltage element superimposed on the DC voltage element, as depicted in FIG. 5C. The AC element is proportional to the peak-to-peak variations in power consumption and power output produced by loading of the tag.

Figure 1B:
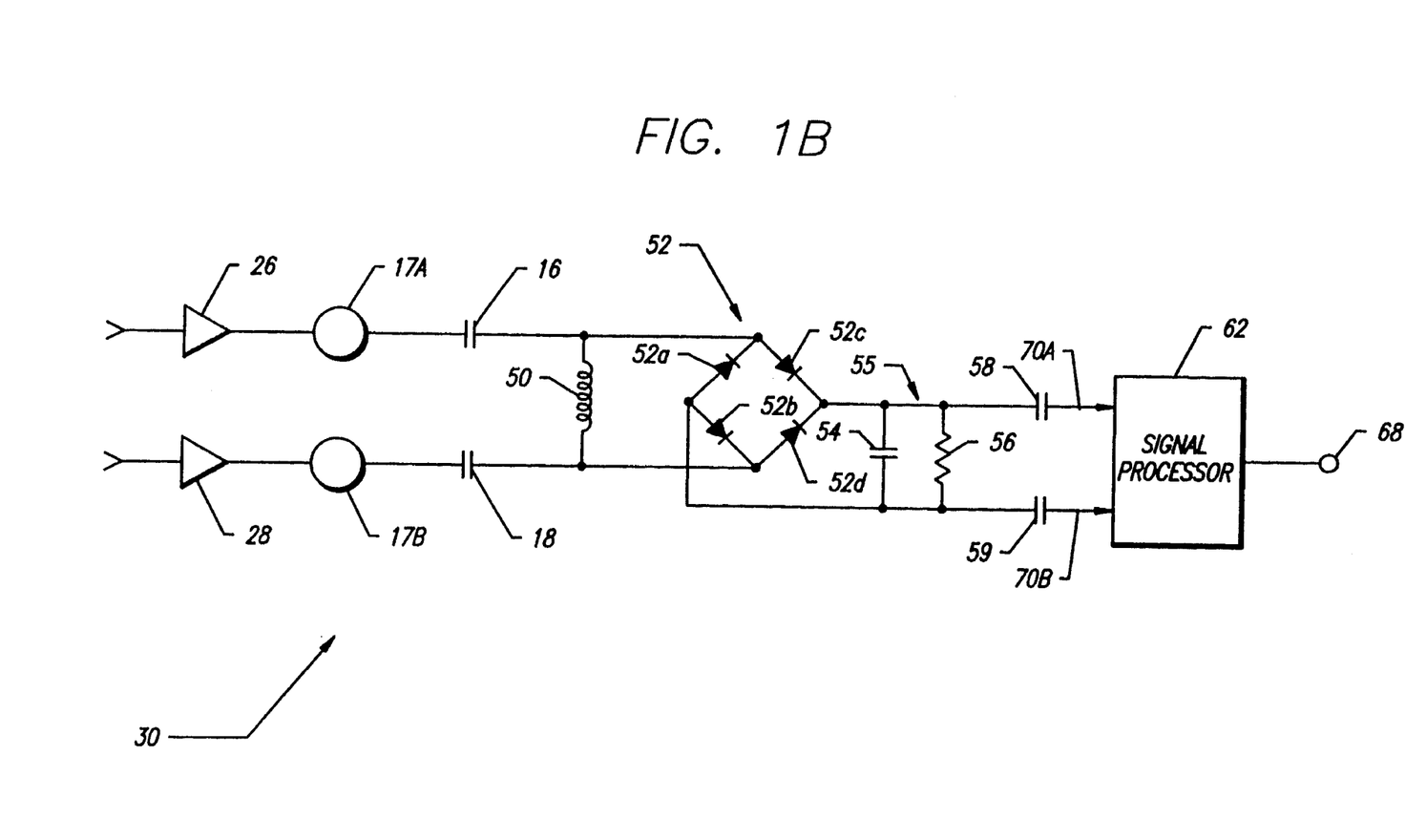
FIG. 1B is a schematic diagram of a first embodiment of a circuit of the invention.
Figure 1C:
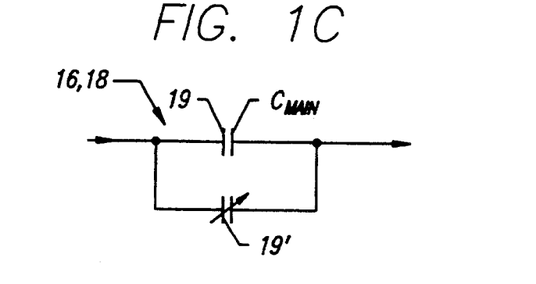
FIG. 1C and 1D are schematic diagrams of alternative capacitor arrangements for the circuit of FIG. 1B.
Figure 1D:
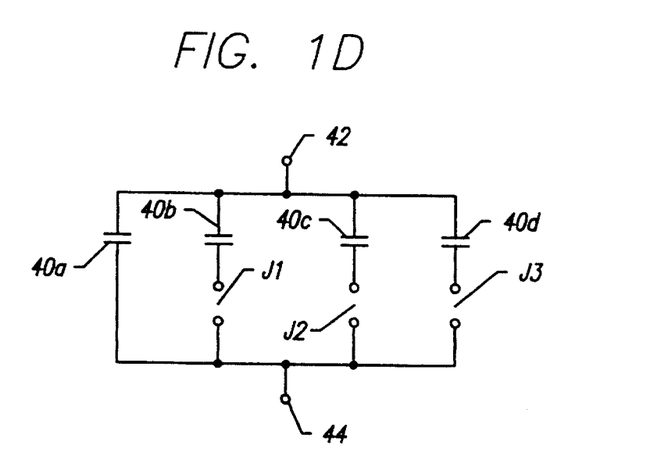

The bridge rectifier is formed of four high-voltage-rated diodes 52a–52d connected in the bridge rectifier arrangement of FIG. 1B. The diodes can be commercially available silicon rectifiers of type HER-104, available from Digi-Key, Thief River Falls, Minn. In such an arrangement, the rectifier will differentially extract both sides of the AC voltage on the coil, producing a full-wave rectified voltage with time-varying characteristics proportional to the reflected signal from the tag.

Figure 5D:
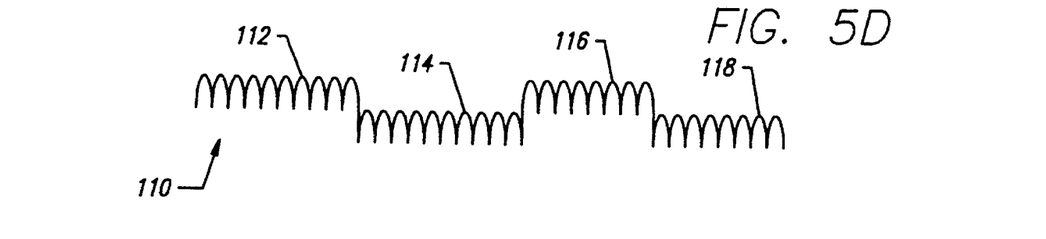

A rectifier output signal measured across the rectifier means yields a rectified waveform 110 of FIG. 5C, the enlarged edge of which is shown in FIG. 5D. The waveform of FIG. 5C is a full-wave-rectified waveform with pulses at amplitude level 108 which may be 250 volts with respect to ground. As shown in FIG. 5D, waveform 110 includes a rippled series of segments 112, 114, 116, and 118. Each bit of digital information has two consecutive segments, one with a high peak and one with a low peak. If the waveform of FIGS. 5A, 5B is the input to the rectifier means, then segments 112, 114 will have ten pulses and segments 116, 118 will have eight pulses. The rectifier output thus provides a pulse train with twice as many pulses per segment as the input waveform. This doubling in pulse count is superior to the prior art because it enables more accurate downstream signal detection.

Moreover, the rectifier causes the difference in amplitude between segment 110A and segment 110B of FIG. 5C to be twice the amount of amplitude difference 104 of the waveform of FIG. 5B or about 20 millivolts. This increased amplitude difference is significant and superior because it enables better calibration of downstream filter circuitry and therefore increases the ability to discriminate and therefore accuracy in decoding the digital signal represented by waveform 110. The doubling in amplitude is a general known characteristic of bridge rectifiers.

Figure 5E:
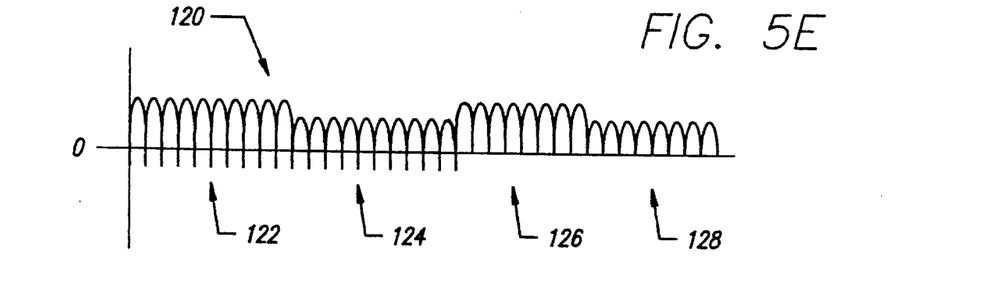

A resistance-capacitance (R-C) filter or filter means 55, coupled to the bridge rectifier, provides a filtered rectifier output signal, the variations in which correspond to variations in power consumption of the tag. The filter can comprise a capacitor 54 with a preferred value of 100 picofarads, and a resistor 56 with a preferred value of 3.3 megohms. After processing by the filter 55 the output signal forms the waveform 120 of FIG. 5E, which is identical to the waveform 110 of FIG. 5D except that the waveform 120 is centered on the zero voltage level.

The filter 55 is coupled to a signal processing means 62 for converting the rectifier output signal to a TTL logic level digital signal. By way of example, the signal processing means can be a low pass filter coupled to a comparator such as that disclosed in Beigel U.S. Pat. No. 4,333,072, incorporated herein by reference.

Figure 4A:
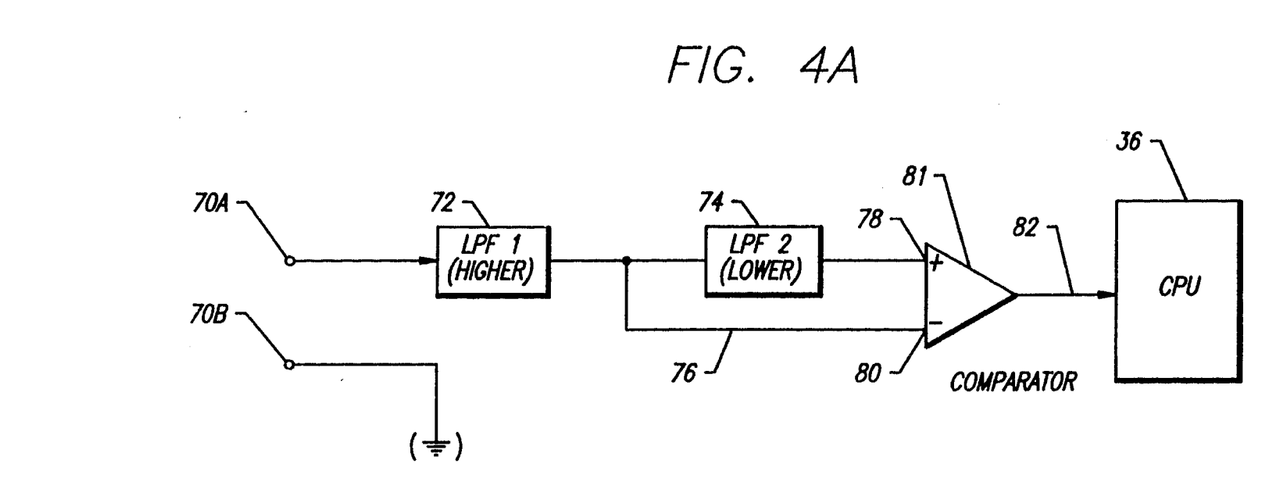
FIGS. 4A and 4B are block diagrams of two frequency filter means.

FIG. 4A shows the basic components of a filter/comparator signal processor circuit. The rectifier output is fed to the signal processor circuit on input lines 70A, 70B. In FIG. 4A, a one-sided processing system is shown, such that input 70B is coupled to ground. However, a balanced system can be constructed in which inputs 70A, 70B pass through essentially identical circuitry. In FIG. 4A input 70A is coupled to a first low pass filter 72 which filters out frequencies at one level of interest and provides a nearly flat output signal which acts as a reference. The output of the first low pass filter is coupled to a second low pass filter 74 and also coupled on a line 76 to the negative input 80 of a comparator 81. The second low pass filter is constructed to remove a frequency range lower than that of the first low pass filter and provide a second output signal. The second output signal of the second low pass filter is coupled to the positive input 78 of the comparator, which compares the second signal to the reference signal from the first low pass filter. When the amplitude of the second signal exceeds the amplitude of the first signal, the comparator generates a high logic level digital output at point 82. This digital output can be coupled to a CPU 36 which can further process the digital signal to decode and display an identification code represented therein.

Alternatively, the R-C filter output signal can be decoded downstream of the R-C filter using a frequency shift-keyed (FSK) arrangement like that of Milheiser. In such an arrangement, as is known in the art, the tag of the system can be constructed to divide the field coil frequency by a factor of 4 or 5 and load the system at these rates. Then, a filter network can be provided to divide the field coil frequency by a factor of 9, 10, and 8, respectively, resulting in a filtered signal limited to the tag loading frequencies.

Figure 4B:
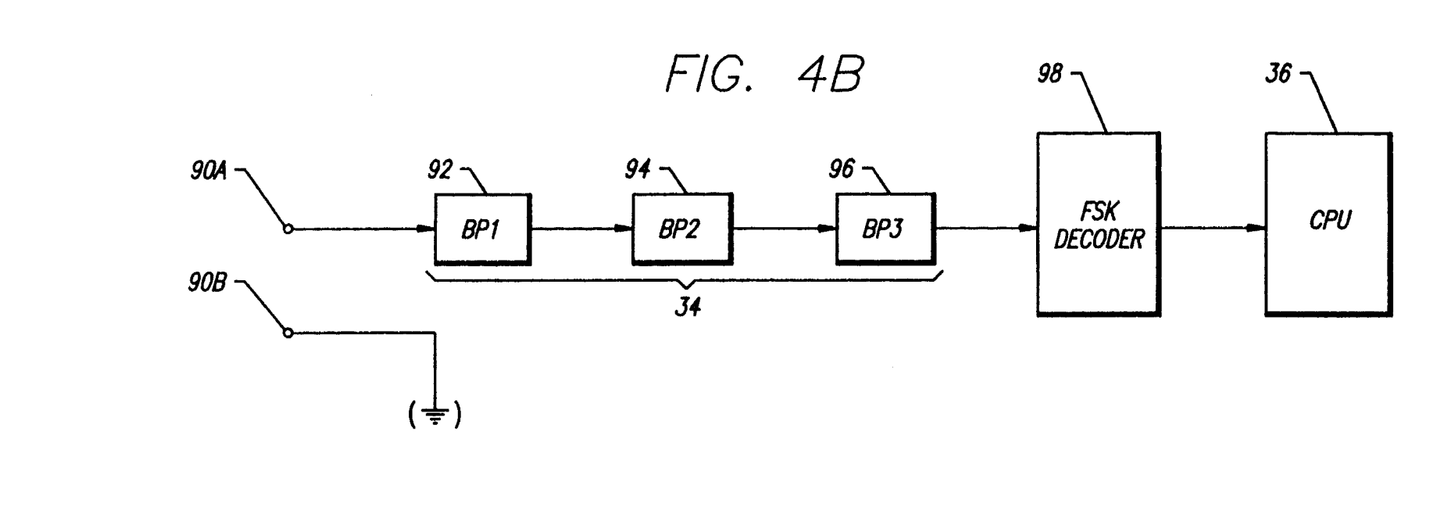

One way to embody this concept is shown in FIG. 4B. In FIG. 4B, a plurality of filters 34 are provided which can comprise a serially connected set of three bandpass filters 92, 94, 96, also shown in the diagram of FIG. 4B. A conventional frequency shift keyed (FSK) decoder circuit 98 can be coupled to the filter output for converting the AC voltage element of the rectified field coil signal to a signal representative of power consumption and for decoding the signal. As is known in the art, an FSK decoder extracts the two different frequencies used in signal transmission, i.e. the pulse segments of 4 or 5 pulses, and translates them into digital values for further processing by a microprocessor such as CPU 36. The digital decoding can be done by an FSK decoder circuit formed around an FSK demodulator/tone decoder device of type XR-2211 commercially available from Exar Integrated Systems, Inc., 750 Palomar Avenue, Sunnyvale, Calif. The type XR-2211 decoder is a phase-locked loop device which responds to changes in the frequency or phase of the input signal. The details of the FSK decoder form no part of the invention, but is shown as one means to decode a digital signal superimposed on the AC waveform, by way of example only.

Figure 3A:
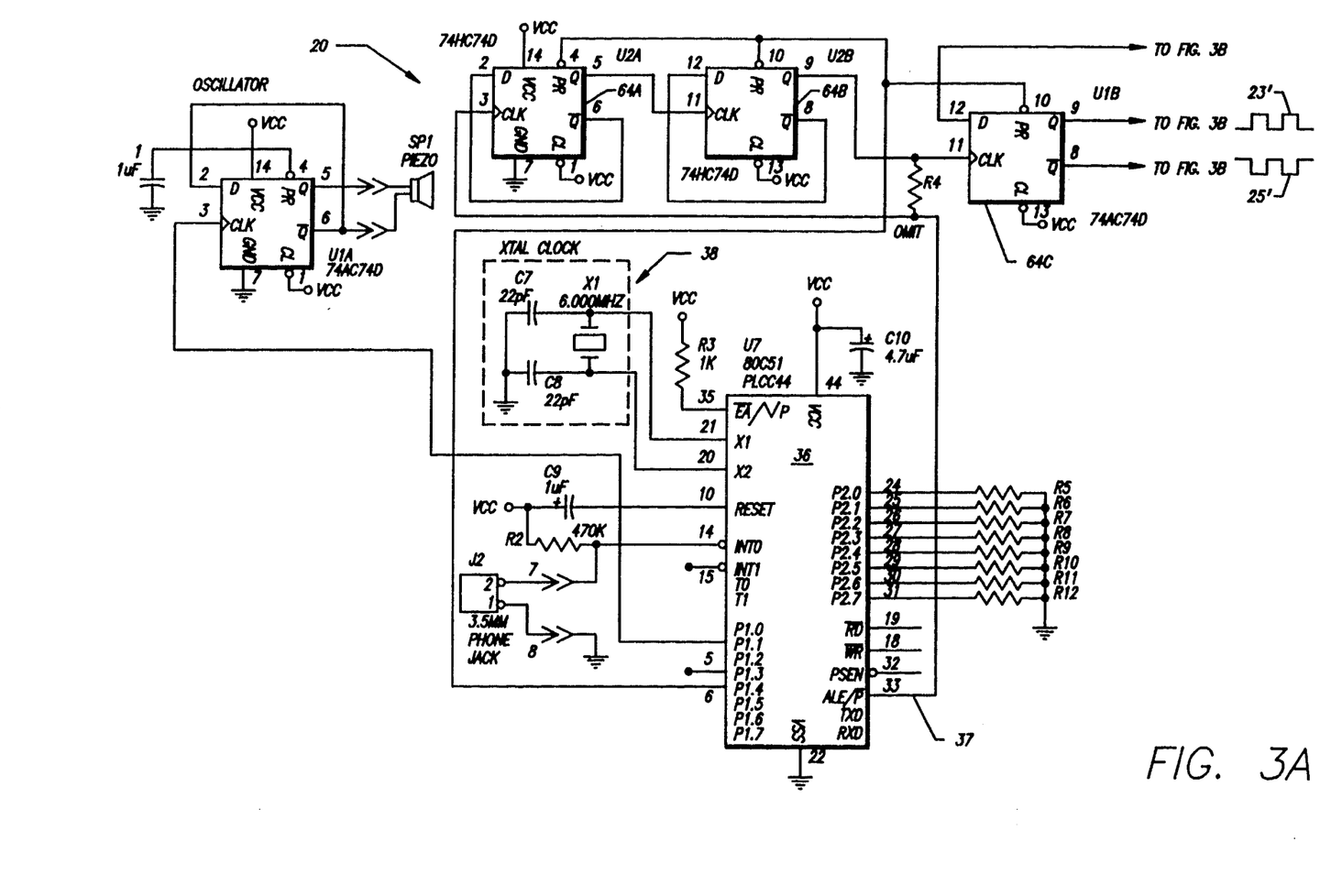
FIGS. 3A and 3B are schematic diagrams of circuitry implementing the embodiment of FIG. 2.

As noted above, a microprocessor such as CPU 36 can be used for further digital processing and decoding, in the general arrangement of FIG. 2. As shown in FIG. 3A, the CPU 36 can be an Intel type 80C51 processor and can operate in cycles synchronized by a clock 38. The clock 38 can be coupled to the oscillator 20, creating a synchronous system, using an internal clock signal 37 of the CPU coupled with a plurality of bistables or flip-flop stages 64A, 64B, 64C. The signal 37 is known in the art as an ALE signal. The flip-flops can be arranged in the circuit of FIG. 3A to divide the clock frequency by a power of two to provide complementary square wave output drive signals. For example, the clock signal can be routed through a divide-by-8 counter formed by flip-flops 64A, 64B, 64C using two standard integrated circuits of type 74AC74D and 74HC74D, available from Digi-Key, Thief River Falls, Minn. In this arrangement, the clock determines the operating frequency of the entire system of FIG. 2.

Figure 3B:
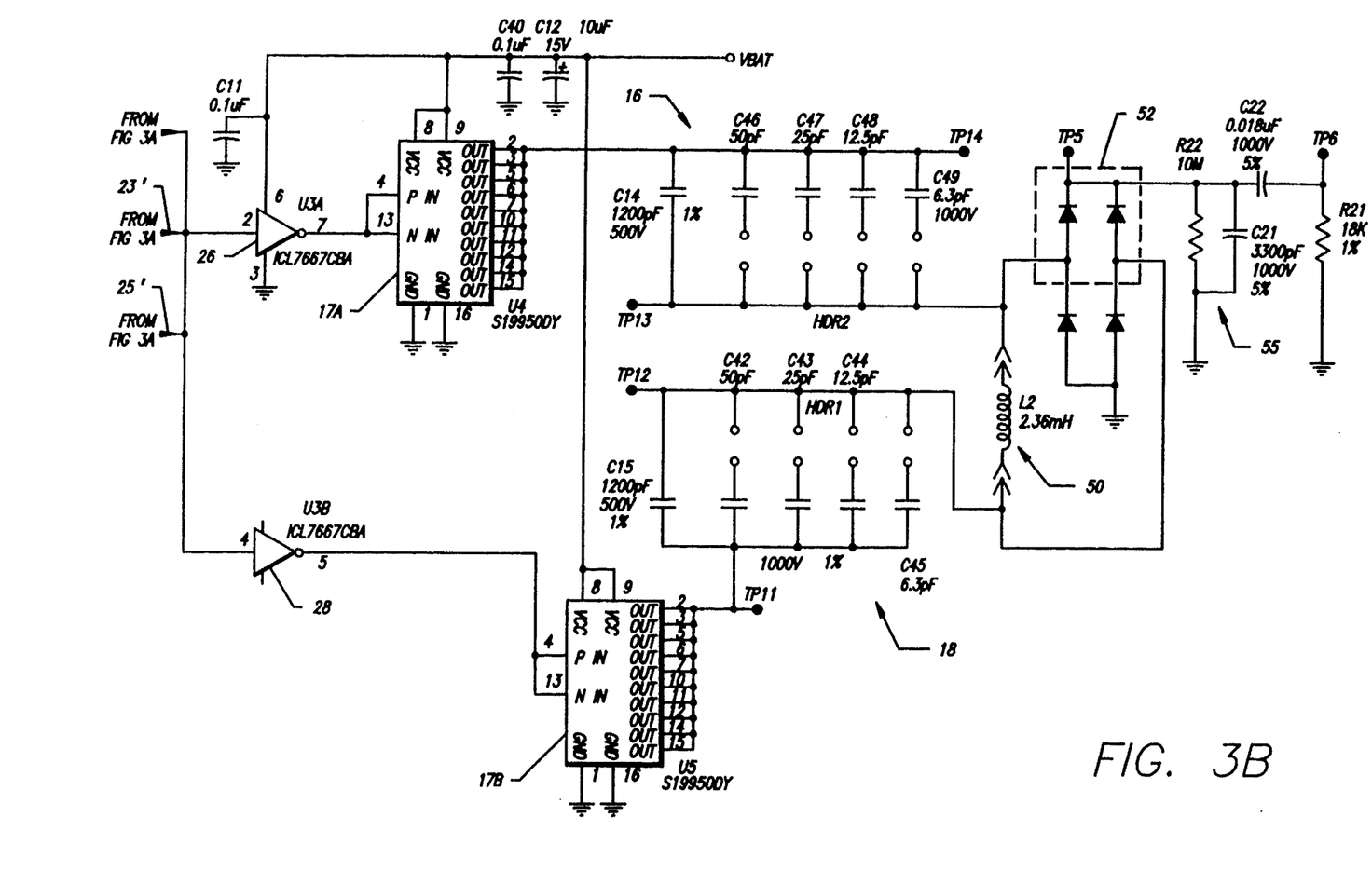

If CPU oscillator generation is used, the output of the divide-by-8 counters will be at digital logic and current levels which cannot be directly coupled to the field coil. Therefore, as shown in FIG. 3B, the drive signals can be coupled through inverters 26, 28 to driver ICs 17A, 17B and then to field coil means 30. The driver ICs 17A, 17B preferably comprise integrated circuits commercially designated type SI9950DY; each comprises a complementary pair of power metal oxide silicon field effect transistors (power MOSFETs), which provide power sufficient to drive the field coil.

The CPU can drive a digital display 40 which can be a commercially available alphanumeric dot matrix liquid crystal display (LCD) or similar device. Preferably the display comprises a 1 line by 16 character display commercially available such as Amperex model AMX116 or equivalent.

As an optional accessory, the reader can include an input/output (I/O) interface 42 to an external device 43, such as a conventional RS-232 serial interface. The RS232 interface can be formed around a MAXIM type MAX230241 integrated circuit RS-232 driver/receiver device, commercially available from MAXIM Integrated Products, 120 San Gabriel Drive, Sunnyvale, Calif.

The circuit disclosed herein provides as much as a fourfold increase in transmitted power for a given power supply input voltage, a twofold increase in signal sensitivity for a given variation in tag power consumption, and a twofold increase in ripple frequency for the rectified tag variation signal.

The present invention contemplates many variations and alternative embodiments. For example, numerous different types of filtering schemes can be used to extract a digital signal from the analog signal sensed using the field coil means. A different CPU arrangement, or none, can be used. Different capacitor and inductor values can be used to alter the performance of the system. Also, numerous alternate circuits are possible to cause loading and unloading of the tag and to create different signal transmission protocols, each of which might optimally use different filtering, recognition, and detection circuits. Thus, the scope of the present invention should not be limited to the foregoing detailed description, but rather should be determined by reference to the appended claims.

I claim:

1. A signal transmission and tag power variation measurement circuit for an inductive tag reader wherein the tag reader is operative with a tag having an ID means for providing a data signal and a receiving coil coupled to the ID means for inducing a power supply voltage, the tag reader including a differential driver means coupled to a power source for producing first and second complementary drive signals, the gag power variation measurement circuit comprising:

a coil having first and second ends;

paired capacitors, including a first capacitor for first differentially coupling said first complementary drive signal to said first end of the coil, and a second capacitor for second differentially coupling said second complementary drive signal to said second end of said coil, wherein each of said first and second differential couplings generates an electromagnetic field which is emitted from said coil, and wherein both of said first and second capacitors sense a data signal output from the tag;

rectifier means coupled to the first and second sides of the coil means in parallel with said capacitance bank for producing a rectified encoded signal representing the data signal; and signal conversion means, coupled to said rectifier means, for providing an output signal representative of the data signal of the tag.

2. Apparatus for measuring power variations in an inductively coupled tag reader system, wherein the system includes a tag having ID means for providing a data signal and a receiving coil coupled to the ID means, and tag reader means having differential driver means coupled to a power source for producing first and second complementary drive signals, the apparatus comprising:

field coil means for receiving the first and second complementary drive signals through a first and second capacitor, respectively, each capacitor being coupled at a respective end of said field coil means, and for producing an electromagnetic field in the field coil to induce a voltage in the receiving coil proportional to the data signal of the tag;

rectifier means coupled to the field coil means for producing a rectified output signal indicative of the data signal of the tag comprising a DC element and an AC element superimposed on the DC element; and filter means coupled to the rectifier means for filtering the rectified output signal and for providing a filtered output signal.

3. An inductively coupled tag reader system for reading data stored in a tag, the reader system comprising:

balanced differential coil driver means for producing first and second complementary drive signals;

balanced resonant coil means for receiving the first and second complementary drive signals and for routing the first and second drive signals through a coil thereof, the balanced resonant coil means coupling the first complementary drive signal through a first capacitor coupled to a first end of the coil and coupling the second complementary drive signal through a second capacitor coupled to a second end of the coil;

detection and filtering means for sensing variations in the power in the coil resulting from inductive coupling with the tag, the variations representative of the data stored in the tag.

4. The system of claim 3, wherein the balanced resonant coil means further comprises:

field coil means for generating an electromagnetic field;

means for interconnecting the field coil means and the first and second complementary drive signals; and inductively coupling an electromagnetic field to the tag for inducing voltage and current in the tag to enable the transmission of the data signal to the field coil means.

5. The apparatus of claim 4, wherein the field coil means further comprises a field coil having first and second inputs and the means for interconnections comprises a pair of equal-valued capacitors for providing a high common-mode noise rejection.

6. The system of claim 3, wherein the detection and filtering means further comprises rectifier means attached to the field coil means in parallel with the first and second complementary drive signals for converting an induced voltage and current to a rectified power signal comprising a DC element and an AC element superimposed on the DC element, the DC element proportional to a signal from the tag, the AC element proportional to variations in the signal from the tag, the variations representative of the data stored in the tag.

7. The apparatus of claim 6, wherein the rectifier means further comprises a full-wave bridge rectifier for directly sensing the induced voltage.

8. An inductively coupled tag reader system for reading data transmitted by a tag, comprising:

driver means attached to a signal source for producing first and second complementary drive signals;

field coil means for receiving the first and second complementary drive signals and for generating an electromagnetic field inducing a voltage in the tag; and means for inducing a voltage quantitatively related to data transmitted by the tag in the field coil means;

rectifier means attached to the field coil means for sensing and converting the induced voltage to an intermediate signal; and filter means attached to the rectifier means for converting the intermediate signal to a filtered output signal representative of the data transmitted by the tag.

9. The tag reader system of claim 8, wherein the field coil means comprises a coil having a first input, and a second input, wherein the first input is attached through a first capacitor to one of the first and second complementary drive signals and the second input is attached through a second capacitor to another of the first and second complementary drive signals.

10. The apparatus of claim 8, further comprising first and second capacitors, wherein the field coil means is coupled, at respective ends thereof, to the first and second complementary drive signals through the first and second capacitors, respectively.

11. The apparatus of claim 8, wherein the field coil means comprises a coil having first and second inputs, the first input being differentially coupled to the first complementary drive signal through a first capacitor, and the second input being differentially coupled to the second complementary drive signal through a second capacitor.

12. The apparatus of claim 11, wherein each of the first and second inputs is coupled to one of the first and second complementary drive signals by one of the pair of capacitors.

13. The apparatus of claim 8, wherein the rectifier means comprises a plurality of diodes arranged as a full wave bridge rectifier for directly sensing the induced voltage.

14. The apparatus of claim 8, wherein the signal source of the driver means comprises an oscillator circuit for producing a recurring signal coupled to a complementary driver circuit for producing the first and second complementary drive signals.

15. The apparatus of claim 8, wherein the filter means comprises a high impedance filter.

16. A method for reading data transmitted by a tag in an inductively coupled tag reader system comprising the steps of:

generating an electromagnetic field using a differential driver means capacitively attached in parallel to a balanced resonant coil detection means;

inductively coupling the balanced resonant coil detection means to the tag using the electromagnetic field;

inducing a voltage and current in the balanced resonant coil detection means and the tag; and directly sensing variations in the induced voltage and current using a detection and filtering means, the variations representative of the data stored in the tag.

* * * * *